Aug. 21, 1951 J. S. BARRETT 2,565,012
SAFETY MOUNTING FOR REARVIEW MIRRORS
Filed Jan. 14, 1950
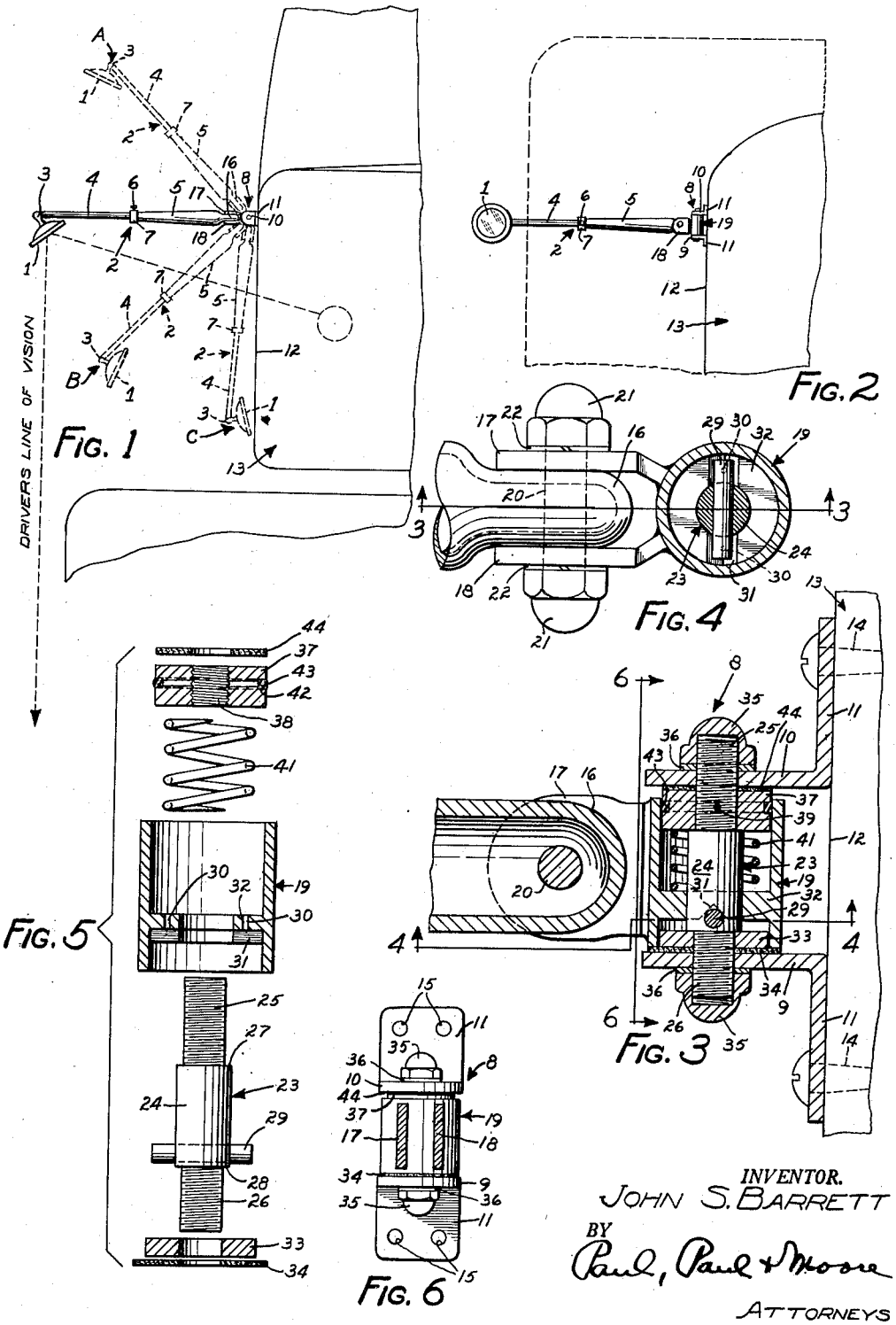
INVENTOR.
JOHN S. BARRETT
BY
Paul, Paul & Moore
ATTORNEYS Patented Aug. 21, 1951

2,565,012

UNITED STATES PATENT OFFICE 2,565,012

SAFETY MOUNTING FOR REARVIEW MIRRORS

John Stephen Barrett, Minneapolis, Minn.

Application January 14, 1950, Serial No. 138,581

5 Claims. (Cl. 248—296)

This invention relates to new and useful improvements in rear view mirrors, and more particularly to such devices of the general type used on commercial vehicles, such as trucks, buses, and the like.

Many such vehicles are provided with bodies that are mounted for relative movement on the vehicle chassis, such as dump trucks, and, as the rear view mirror must be mounted in relatively fixed relation to the driver's seat, it has become common practice to mount the rear view mirror on the exterior of the left side wall or cowl of the driver's cab. This makes it necessary on many trucks to support the mirror on the outer end of an arm mounted directly upon the cab wall. The mirror, as is well known, is mounted for universal adjustment on the arm, and the bracket which mounts the arm on the cab wall usually provides for vertical adjustment of the outer end of the arm so that the driver of the truck may properly position the mirror with respect to his line of vision in a direction rearwardly of the vehicle.

It is also well known that the load carrying bodies of a great many commercial trucks and vehicles may be considerably wider than their respective driver's cabs. Therefore to be effective, the mirror must be positioned beyond the outermost wall of the truck body in order that the driver may have clear unobstructed vision rearwardly of the truck, when backing up to a loading platform, or maneuvering the truck into or out of restricted areas.

Because of the necessity of the rear view mirror supporting arm being so long, such arms are usually made very sturdy and rugged in construction in order that they may withstand vibration and jars or jolts to which they may be subjected, and whereby they will retain their adjusted positions to maintain maximum rearward vision for the driver at all times.

Heretofore, there is one drawback to thus position the rear view mirror beyond the side wall of the truck body, and that is it places the mirror in a rather vulnerable position relative to fixed objects, whereby it may readily become damaged when maneuvering the truck through narrow alleys, or when backing the truck into position relative to a loading and unloading platform, or into a parking space, should the rear view mirror or its supporting arm engage a relatively fixed object while thus maneuvering the vehicle. It is therefore highly desirable that the mounting means for the mirror be so designed and constructed that should the mirror accidentally engage or strike a relatively fixed object while the vehicle is in motion, either forwardly or rearwardly, the mirror supporting arm may yield and swing towards the cab wall and thus prevent damage to the mirror and its mounting means, and possibly to the cab wall.

A further object is to provide a mounting bracket for a rear view mirror supporting arm, embodying a pivot provided with a locking device for securing the arm in its normally extended position, said locking device permitting the mirror supporting arm to swing rearwardly or forwardly upon impact with an obstruction, thereby to avoid damage to the mirror and its supporting means.

A further object is to provide a rear view mirror mounting bracket having means for conveniently securing it to a fixed support such as the side wall of a driver's cab or the usual cowl of the vehicle, said arm being longitudinally adjustable to facilitate accurately positioning the mirror beyond the outermost side wall of the truck body, whereby the driver may have clear vision at all times in a rearward direction, and said mounting bracket permitting the mirror supporting arm to yield, should said arm or the mirror engage a fixed obstruction while the vehicle is in motion.

Other objects of the invention reside in the novel construction of the mounting bracket whereby the mirror is adapted for universal adjustment to facilitate accurately positioning the mirror with respect to the driver's line of vision; in the provision of a mirror mounting of the class described, which is so ruggedly constructed that the mirror is not likely to vibrate, even when traveling over rough roads, and also whereby the driver of the vehicle may be assured at all times that the mirror supporting arm will retain the mirror in its proper position, even after the arm has been struck by an obstruction and is returned to its normal position; in the construction of the simple locking means embodied in the mounting bracket which positively retains the mirror in its proper position with respect to the driver's line of vision in a rearward direction at all times; and in the provision of such a device which may be manufactured in quantity production at very low cost.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a top plan view showing a portion of a commercial automotive vehicle with the invention embodied thereon, the dotted lines indicating various positions of the mirror and its supporting arm;

Figure 2 is a view looking forwardly from a position rearwardly of the rear view mirror, and showing the mirror positioned beyond the adjacent side wall of the truck body;

Figure 3 is an enlarged detail sectional view substantially on the line 3—3 of Figure 4;

Figure 4 is a fragmentary detail sectional view substantially on the line 4—4 of Figure 3;

Figure 5 is a detail sectional view showing the various parts of the mounting bracket separated to more clearly illustrate the construction thereof; and Figure 6 is a detail sectional view on the line 6—6 of Figure 3, on a smaller scale.

In the selected embodiment of the invention herein disclosed, there is illustrated in Figures 1 and 2, for purposes of disclosure, a rear view mirror of more or less conventional design, designated by the numeral 1. The mirror is secured to the outer end of an arm 2 by a well known form of ball-and-socket joint 3, whereby the mirror is universally adjustable on the arm to facilitate correctly aligning it with the eyes of the driver seated within the cab.

The arm 2 is shown comprising an outer member 4 which may be solid or tubular in cross section, and is telescopically supported in the outer end of a tubular member 5, and longitudinally adjustable therein by a suitable clamping screw 6, shown received in threaded engagement with a collar 7 forming a part of the member 5 of the mirror supporting arm.

An important feature of the present invention resides in the unique construction of the means provided for supporting the arm 2, whereby the mirror 1 and its supporting arm may yield in a rearwardly or forwardly direction, should the mirror accidentally strike an obstruction or fixed object while the vehicle is in motion, either forwardly or rearwardly, or when parked.

The means provided for thus supporting the mirror arm 2, comprises a composite bracket, generally designated by the numeral 8, including opposed angle brackets 9 and 10 having base portions 11 adapted to be seated against a suitable support such as the adjacent side wall 12 of the driver's cab 13, and fixedly secured thereto by suitable screws or bolts 14, received in apertures 15 provided in the base flanges 11 of the angle brackets 9 and 10, as shown in Figures 3 and 6.

The member 5 of the mirror supporting arm 2 preferably has its inner end 16 slightly flattened, as shown in Figure 4. The flattened end 16 is frictionally secured in position between spaced flanges 17 and 18, shown integrally formed on a suitable hub or casing 19. To secure the arm portion 5 in adjusted position between the flanges 17 and 18, a clamping bolt 20 is received in aligned apertures provided in the arm portion 5 and flanges 17 and 18 of the hub 19. Suitable clamping nuts 21 are received in threaded engagement with the clamping bolt 20, whereby the flanges 17 and 18 may be drawn up sufficiently to cause them to frictionally secure the mirror supporting arm 2 in any of its adjusted positions, vertically. Suitable lock washers 22 may be interposed between the nuts 21 and their respective flanges 17 and 18 to prevent the nuts from working loose, as is well known.

The hub or casing 19 is supported on a shouldered stud, generally designated by the numeral 23, shown comprising a main body portion 24 and threaded end portions 25 and 26 of relatively smaller diameter than the body portion 24, thereby to provide annular shoulders 27 and 28.

A pin 29 is secured in the body 24 of the stud 23 adapted to be received in a V-shaped notch 31 provided in a transverse wall 32 of the hub 19, when the parts are assembled, as shown in Figure 3. The pin 29 cooperates with the V-shaped notch 31 to retain the mirror supporting arm 2 in its proper position with respect to the longitudinal center line of the vehicle.

A washer 33 is fitted onto the lower threaded end portion 26 of the stud 23 against the shoulder 28 thereof. A suitable fiber washer 34 is shown interposed between the bottom edge of the hub 19 and the angle bracket 9 and is firmly clamped against said bracket by manipulation of a lock nut 35, received in threaded engagement with the stud terminal 26. A suitable lock washer 36 is interposed between the nut 35 and bracket 9 to secure the nut against loosening. The washer 34 cooperates with the collar 33 to render the lower end of the hub 19 substantially oiltight.

A collar generally designated by the numeral 37 is provided with a threaded aperture 38 adapted to receive the upper reduced end portion 25 of the stud 23, and is securely locked thereto by a lock pin 39, as shown in Figure 3. The collar 37 extends well downwardly into the upper end of the hub 19, and cooperates with the cross wall 32 in the hub to provide abutments for the ends of a suitable coiled spring 41 mounted within the hub, as shown in Figure 3.

The collar 37 is provided with a peripheral groove 42 adapted to receive a suitable packing 43, which engages the wall of the bore in the hub 19, thereby to prevent oil leakage from the upper end of the hub. A suitable fiber washer 44 is interposed between the upper end of the collar 37 and the angle bracket 10 is secured therebetween by manipulation of a clamping nut 35, similar to the one secured to the bottom end of the stud 23. A lock washer 36 may be interposed between the bracket 10 and nut 35, as will be understood.

When the supporting bracket 8 for the mirror is mounted upon and secured to the side wall of a cab, as illustrated for example in Figures 1 and 2, the stud 23 is usually vertically disposed, whereby the mirror supporting arm 2 may swing about the axis of the stud 23 in a horizontal plane. This constitutes an important part of the present invention.

The position of the cross pin 29 in the stud 23 determines the position of the arm with respect to the longitudinal center line of the vehicle body. Usually the arm is so adjusted that it is disposed in substantially right angular relation to the longitudinal center line of the truck body. The spring 41 constantly urges the hub 19 downwardly to the position shown in Figure 3, wherein the cross pin 29 of the stud is lockingly received in the V-shaped notch 31 provided in the wall 32 of the hub 19.

Should the outer end of the arm or the mirror accidentally strike an obstruction or a fixed object, when maneuvering the vehicle either forwardly or rearwardly, the opposed inclined faces of the V-shaped notch 31 will engage the pin 29, whereby the hub 19 is cammed upwardly against the tension of the spring 41, whereby the hub 19 and arm 2 may readily be swung rearwardly or forwardly without causing damage thereto or to the wall of the cab, as indicated by the dotted line positions A and B in Figure 1. If desired, the mirror supporting arm 2 may be folded flatly against the cab body, as shown at C in Figure 1.

The amount of pressure required to be exerted against the mirror supporting arm 2 or the mirror 1 to cause the arm to yield and swing rearwardly or forwardly, when engaged by an obstruction, may be controlled by manipulation of the clamping nuts 35 of the stud 23. In like manner, the vertical adjustment of the arm 2 may readily be controlled by manipulation of the clamping nut 21 of the stud 23.

By reference to Figure 3 it will be noted that the overall length of the hub 19 is relatively less than the spacing between the angle brackets 9 and 10. This is necessary in order to provide room for the hub 19 to move upwardly on the stud 23 and out of locking engagement with the pin 29, when the arm or mirror engages an obstruction which may cause the arm to yield and swing rearwardly or forwardly to positions B or A, indicated in Figure 1. Because of the cross pin 29 being fixed with respect to the longitudinal center line of the vehicle body, it will be readily understood that after the arm is swung out of its normal position, as indicated by the dotted lines A or B in Figure 1, said arm will immediately assume its proper operative position when swung back to cause the V-shaped notch to become aligned with the pin 29, the spring 41 forcing the hub 19 into its normal lowered position shown in Figure 3.

The interior of the hub 19 may be packed or filled with a suitable lubricant, whereby the mounting bracket may be operated for long intervals without requiring any maintenance service. Oil ducts 30 may be provided in the horizontal wall 32, as shown in Figures 4 and 5, whereby the cam surfaces of the V-shaped notch 31 may receive ample lubrication from the enlarged chamber of the hub 19.

The novel bracket herein disclosed protects the rear view mirror and its supporting arm from becoming damaged, should the mirror engage a fixed object or other obstruction while the vehicle is in motion either forwardly or rearwardly, or when parked. In addition to protecting the mirror and its supporting means from becoming damaged, the mounting bracket 8 also serves to protect the cab wall from becoming damaged in the event the mirror or its supporting arm strikes an obstruction, which in the case of operators of large fleets of trucks, may result in a substantial saving in maintenance costs, as will be understood.

The foregoing detailed description has been given for clearness of understanding only, and no unnecessary limitations should be understood therefrom, but the appended claims should be construed as broadly as permissible in view of the prior art.

I claim as my invention:

1. A safety mounting for rear view mirrors comprising a bracket having a stud secured therein, a hub mounted for pivotal movement on said stud, an arm having one end secured to the hub, a mirror adjustably supported at the outer end of the arm, and means on said stud adapted for interlocking engagement with means in said hub to normally retain the mirror in alignment with the driver's line of vision, said interlocking means being concealed within the hub and permitting the arm to yield and swing out of the way of an obstruction, should the arm or mirror accidentally engage an obstruction when the vehicle is in motion, thereby to prevent damage to the rear view mirror and its supporting means.

2. A safety mounting for rear view mirrors in accordance with claim 1, wherein the interlocking means in the hub and on said stud consists of a cross pin secured in the stud and normally received in a V-shaped notch provided in a horizontal wall of said hub.

3. A safety mounting for rear view mirrors comprising an arm including telescoping members, whereby the overall length of the arm may be varied, a mirror adjustably secured to the outer end of the arm, a mounting bracket including opposed angle elements having means for securing them to a fixed portion of a vehicle body such as the side wall of a vehicle cab, a shouldered stud secured to said angle elements and normally retained in fixed position relative thereto, collars mounted in fixed spaced relation on said stud and having their outer faces engaged with said angle elements, said mirror supporting arm having a hub mounted for rotary movement on said collars and stud, and interlocking means on said stud and hub for normally retaining the mirror supporting arm in its normal extended position, but permitting said arm and mirror to yield to prevent damage thereto, should the arm or mirror accidentally engage an obstruction while the vehicle is in motion.

4. A safety mounting for rear view mirrors comprising opposed angle brackets having means for securing them to the wall of a vehicle cab, a shouldered stud having threaded end portions received in aligned apertures in said brackets, a hub mounted on said stud between said brackets, an arm having one end secured to said hub and extending outwardly therefrom and having a mirror secured to its outer end, collars mounted on the threaded end portions of said stud within the hub, locking means on the stud and said hub for securing the hub in relatively fixed position with respect to said brackets, under normal operating conditions, and whereby the arm and mirror are retained in extended operative position, a spring constantly urging the hub in a direction to cause said locking means to secure the arm against swinging movement in a horizontal direction, and means whereby should the arm on said mirror engage an obstruction when the vehicle is in motion, said locking means will permit the arm to yield and swing clear of the obstruction, and thus avoid damage thereto.

5. A safety mounting for rear view mirrors according to claim 4, wherein the hub is mounted for limited axial movement on said stud, thereby to control the operation of said locking means.

JOHN STEPHEN BARRETT.

REFERENCES CITED

The following references are of record in the file of this patent:

UNITED STATES PATENTS

| Number | Name | Date |
|---|---|---|
| 2,113,251 | Dover | Apr. 5, 1938 |
| 2,411,448 | McLean | Nov. 19, 1946 |
| 2,488,316 | Mosby | Nov. 15, 1949 |